Aug. 26, 1947.   W. E. VAN DORN   2,426,537
JET THRUST MOTOR
Filed March 10, 1944   5 Sheets-Sheet 1
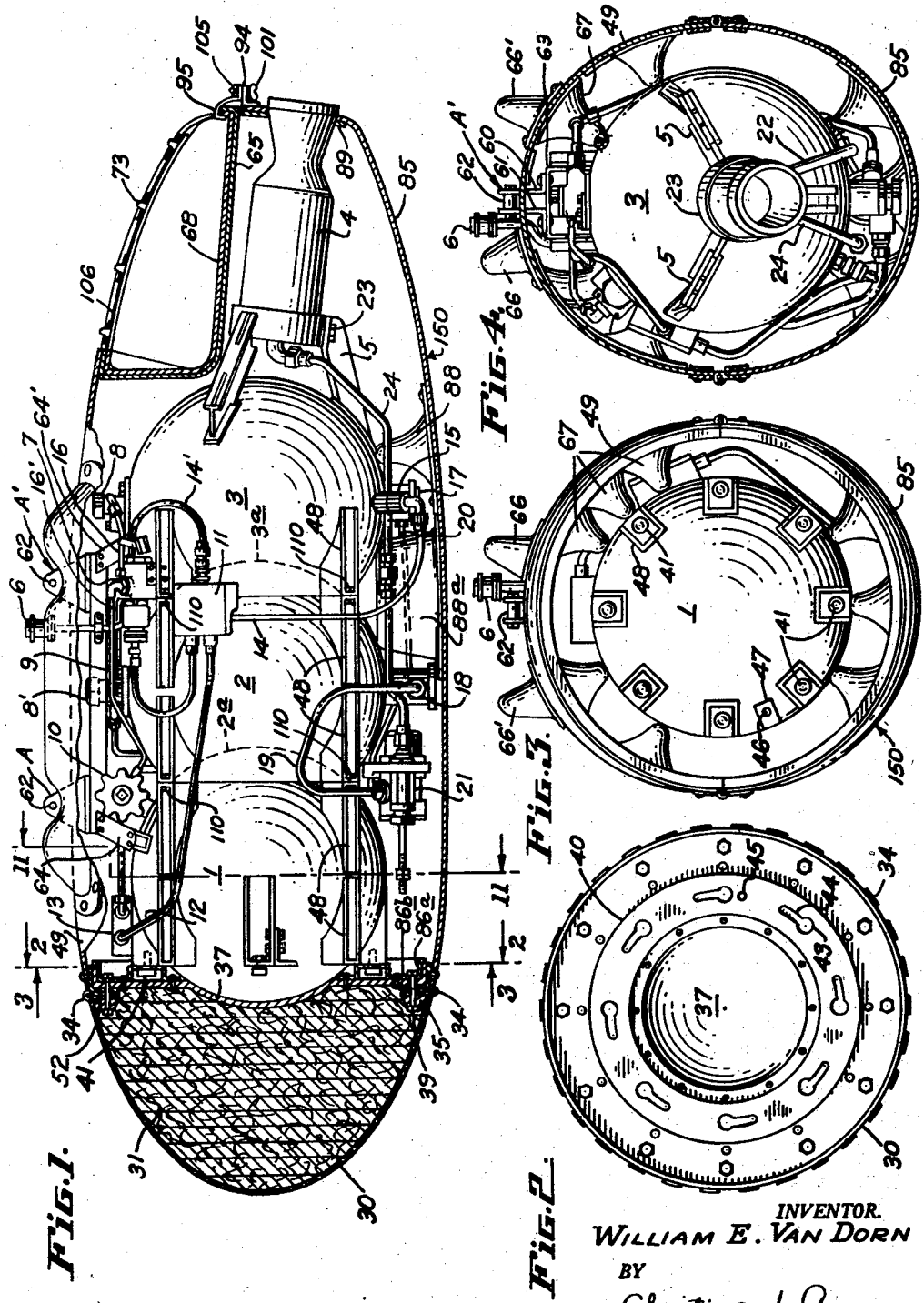
INVENTOR.
WILLIAM E. VAN DORN
BY
Christie and Angus
ATTORNEYS.

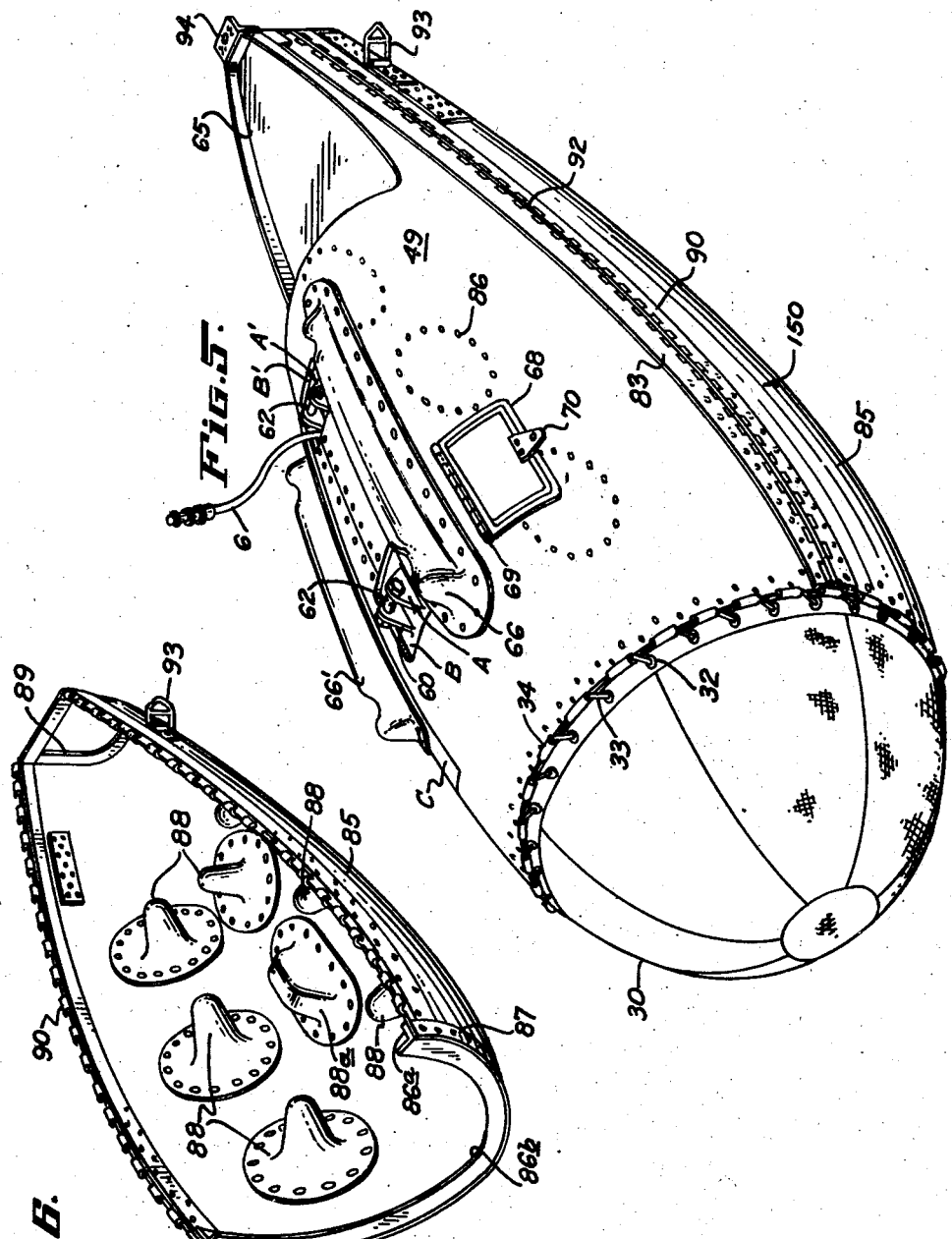

Aug. 26, 1947.                    W. E. VAN DORN                    2,426,537
                                  JET THRUST MOTOR
                              Filed March 10, 1944                5 Sheets-Sheet 3
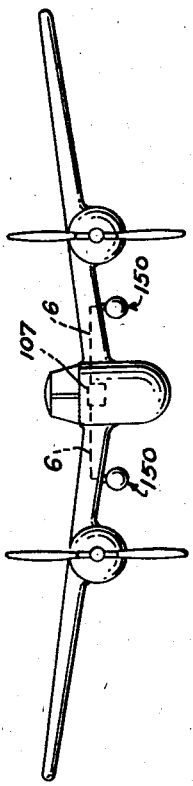
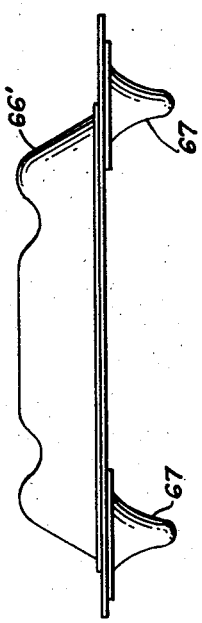
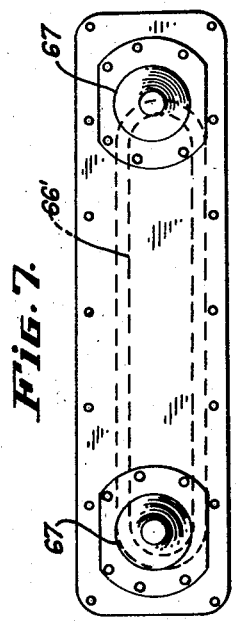
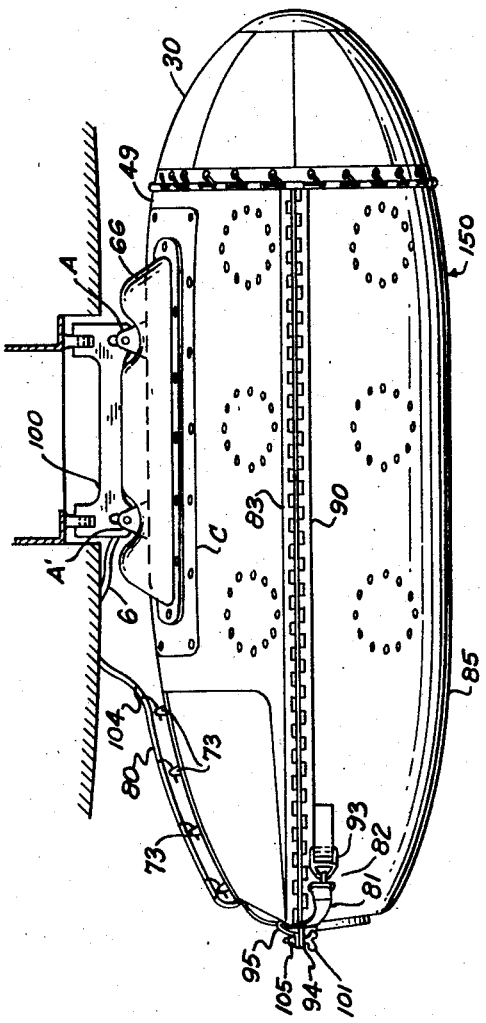
INVENTOR.
WILLIAM E. VAN DORN
BY
Christie & Angus
ATTORNEYS.

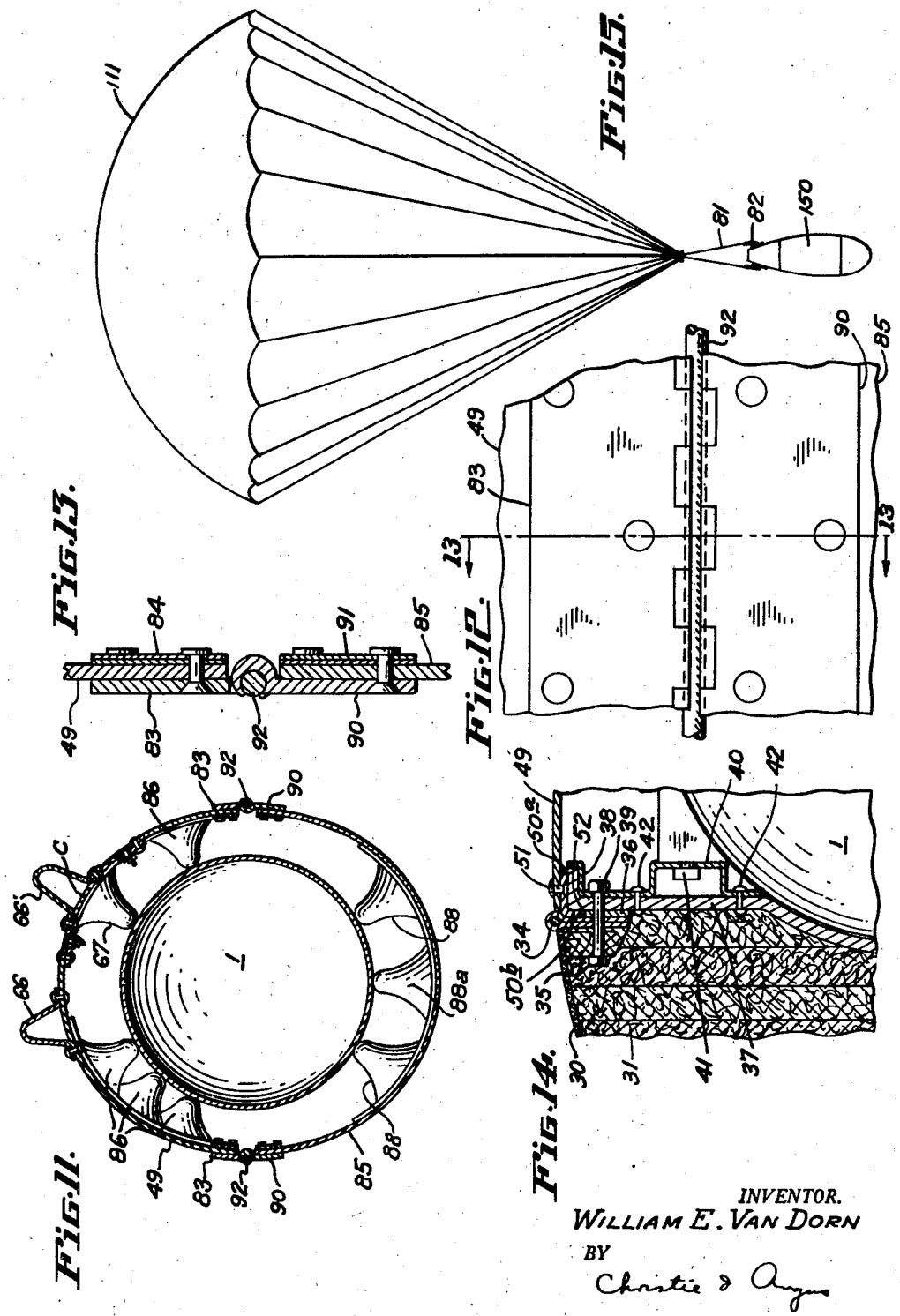

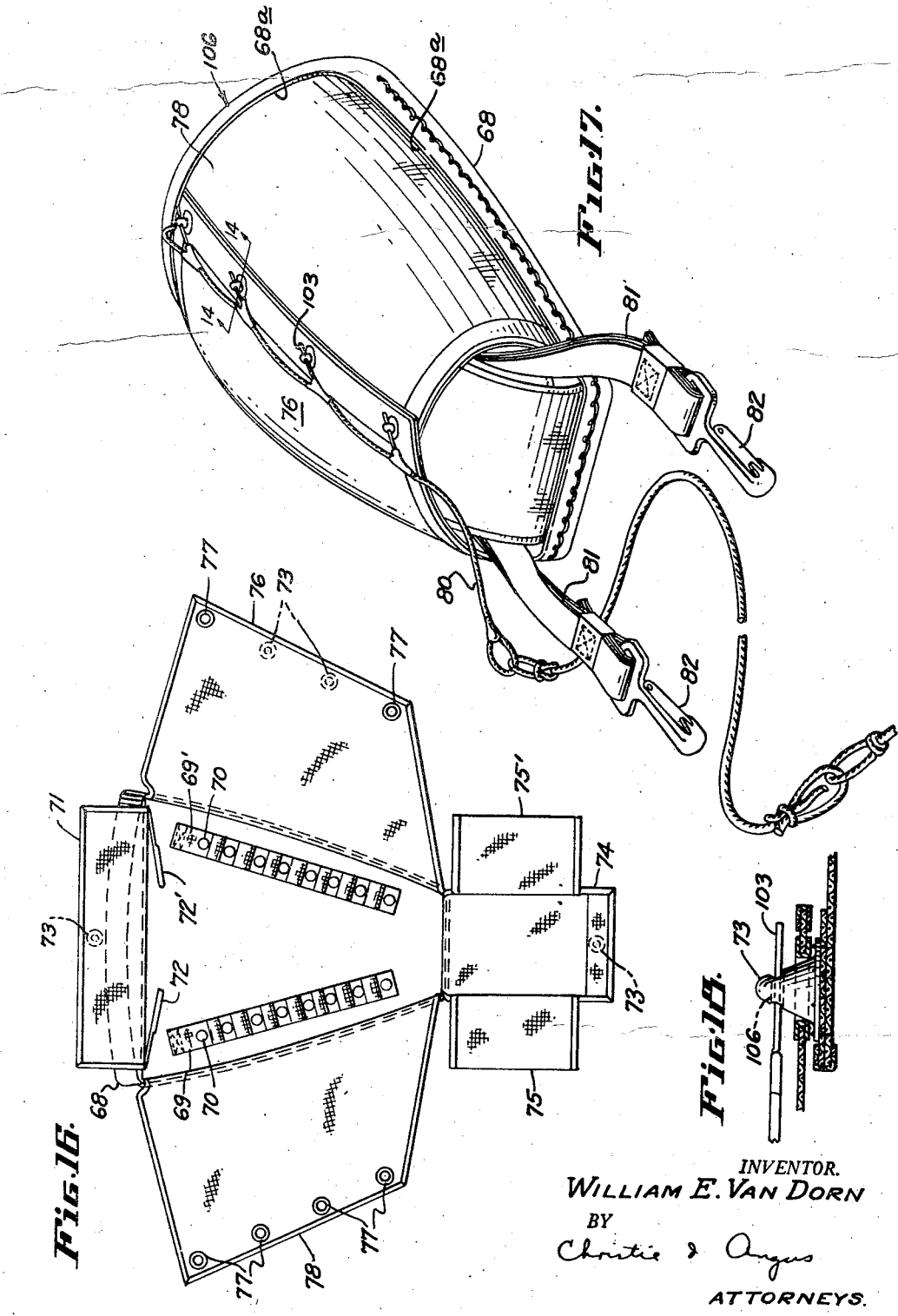

Patented Aug. 26, 1947

2,426,537

UNITED STATES PATENT OFFICE 2,426,537

JET THRUST MOTOR

William E. Van Dorn, Pasadena, Calif., assignor to Aerojet Engineering Corporation, Azusa, Calif., a corporation of Delaware Application March 10, 1944, Serial No. 525,840

4 Claims. (Cl. 60—35.6)

1

This invention relates to thrust motors and particularly to thrust motors of the type useful on aircraft.

The principal object is to provide an assembly of a thrust motor and its operating equipment which can readily be attached and detached to and from an airplane.

Another object is to provide means for detaching the motor while the plane is in flight and to parachute the motor to the ground.

Thrust motors of the jet propulsion type are known in the art. They ordinarily comprise a combustion chamber with an exhaust nozzle leading from the chamber to the exterior. Heretofore, solid propellant motors have been used for assisted take-off and after performing such useful work have been dropped from the airplane to reduce the dead weight thereof.

In accordance with my invention I enclose a jet thrust motor and its operating tanks of propellant and operating equipment in a hull which may be attached beneath an aircraft. The hull is streamlined to reduce air resistance. The motor and its parts are securely held together and supported within the hull.

A feature is the provision of a parachute which opens when the unit, comprising the hull and motor, is dropped.

Another feature is the provision of a nose for the hull capable of withstanding the shock of landing by the parachute.

The invention will be better understood from the following detailed description of specific embodiments thereof, taken in conjunction with the accompanying drawings in which:

Fig. 1 is an elevation view, partly in cross-section, of a unit in accordance with my invention;

Fig. 2 is a rear view of the nose member looking to the left from line 2—2 in Fig. 1;

Fig. 3 is a view from the left side of the unit in Fig. 1 from the line 3—3;

Fig. 4 is a view from the right side of the unit in Fig. 1 with part of the hull removed;

Fig. 5 is a perspective view of the unit showing a recess for a parachute;

Fig. 6 is a perspective view of the lower half of the unit shown in Figs. 1 and 5;

Fig. 7 is a bottom plan view of an inspection door used in the unit;

Fig. 8 is an elevation of the door shown in Fig. 7;

Fig. 9 shows the unit of Figs. 1 and 5 attached to the lower section of an airplane;

Fig. 10 is a front elevation of an airplane with two units according to Figs. 1 and 5;

2

Fig. 11 is a cross section along line 11—11 of Fig. 1;

Fig. 12 is a detailed view of hinges used in the unit;

Fig. 13 is a cross sectional view along line 13—13 of Fig. 12;

Fig. 14 shows in cross section a detail of the attachment of the nose portion in Fig. 1;

Fig. 15 is a view of the jet thrust motor unit supported by a parachute;

Fig. 16 is a plan view of a parachute tray with attached flaps;

Fig. 17 is a perspective view of a packed parachute; and

Fig. 18 is a fragmentary section along line 14—14 as indicated in Fig. 17.

Referring to the drawing, I show in Fig. 1 a streamlined hull comprising three hull portions 30, 49 and 85, fastened together to form a hollow interior. Within the hull is a jet thrust motor 4 and all the fuel and other equipment required to operate it.

There are provided three tanks 1, 2 and 3 bolted to each other by bolts 110 in brackets 48. These brackets 48 are welded to the tanks 1, 2 and 3 as shown. Tank 1 is spherical in shape and fits into the provided re-entrant dimple 2a of the spherical tank 2. Tank 2 fits into the provided re-entrant dimple 3a of the spherical tank 3.

Tank 1 contains a gas such as nitrogen under pressure which is used for pressurizing liquid fuel in tank 2 and a liquid oxidizer in tank 3. The fuel and oxidizer under pressure are led through conduits into the combustion chamber of the jet thrust motor 4 which is attached to tank 3 by means of brackets 5 of which three are shown. A detachable electrical connection 6 from an airplane control panel 107 (Fig. 10) leads into a junction box 11 (Fig. 1) from which an electrical conduit 12 leads to a pressure switch 13 which is attached to the pressure tank 1. Another conduit 14 leads into a level indicator 15, from box 11, which is attached to the oxidizer tank 3 and a third electrical conduit 14' leads from the junction box 11 into the solenoid valve 7. The solenoid valve 7 is connected by a pipe 9 with a regulator valve 10 which is attached to pressure tank 1. Pilot line pipes 16 and 16' lead from the solenoid valve into the pressure line valve 8 attached to oxidizer tank 3, and the pressure line valve 8' which is attached to the fuel tank 2. Also two pipes (not shown) lead from the regulator valve into the respective pressure line valves 8 and 8'. Propellant valve 21 receives the fuel through a pipe 19 which leads out of a fuel filter and drain 18 attached to fuel tank 2, and the oxidizer through pipe 20 which leads out of the oxidizer filter and drain 17 attached to the oxidizer tank 3. The propellant valve 21 then allows the oxidizer to flow through a pipe 24 into the injector cap 23 of the jet thrust motor 4, and the fuel through a pipe 22 as shown in Fig. 4 into the combustion chamber through injector cap 23 of the jet thrust motor.

For attaching the streamlined hull of the jet thrust motor unit to an aircraft, two suspension lugs A and A' (Figs. 1 and 4) are provided which are spaced properly from each other to conform with a standard bomb rack 100 (Fig. 9) as used on military aircraft. The lugs are a combination of two brackets 60 and 61 (Fig. 4) which support a stud 62 between them. The brackets 60 and 61 are fastened to a U-shaped bar 63 which is attached to brackets 64 and 64' which in turn are secured to the forward tank 1 and the aft tank 3 respectively (Figs. 1 and 4).

This assembly of tanks, conduits, control valves and jet thrust motor provides a liquid propellant jet thrust motor unit which is surrounded by a streamlined hull as shown. The hull comprises a nose cap 30 (Figs. 1, 5, 9 and 14) which is of a parabolic outline having a covering of cloth such as canvas or the like and is filled with a soft resilient material 31, such as sisal, which is adapted to absorb shocks (Figs. 1 and 14). The cloth or canvas 30 has a plurality of reinforced eyes 32 (Fig. 5) along its periphery at its reinforced open end and is laced with a steel cable 33 through these eyes to the ears 34 which are secured by bolts 39 to a ring 35 (Fig. 14) made of wood or the like, and further attached to another ring 36, a cup-shaped member 37, and a connecting disc 38. The member 37 may be made of plastic or the like and shaped in its center portion so that it encloses the spherical outline of tank 1 as shown, its outer periphery being shaped to form a cup into which connecting disc 38 is fitted. The disc 38 has a raised annular portion 40 which permits clearance for the heads of the shoulder bolts 41 and is fastened by rivets 42 to the cup-shaped member 37. The annular portion 40 (Fig. 2) is provided with a plurality of annular openings resembling keyslots each having a large hole 43 which permit entry of shoulder bolt head 41, and a slot 44 of a width which is somewhat less than the diameter of hole 43. A tapped hole 45 is provided on the bolt circle and between two such keyslots. A plurality of brackets 48 (Fig. 3) are attached to the spherical tank 1 and provided with shoulder bolts 41, and a bracket 47 with a clearance hole 46 attached to the tank 1. Shoulder bolts 41 are inserted into the brackets 48 just far enough to permit a sliding fit for the wall of the connecting disc 38 (Fig. 14). The nose member 30 is then placed so that holes 43 are in line with the corresponding shoulder bolt heads 41 on the brackets 48 in such a manner that tapped hole 45 of the nose member is near the clearance hole 46 of the bracket 47, and pushed down. The wall of the connecting disc 38 is slidingly held by the shoulder bolts 41. The nose cap in which the stems of the bolts slide in slots 44 is then twisted slightly until clearance hole 46 (Fig. 3) is in line with the tapped hole 45 of the nose member. A small screw passing through hole 46 and into the tapped hole 45 locks this nose member 30 in place.

The streamlined tail portion of the hull is made of two halves. The upper half 49 (Figs. 1, 5 and 14) may be of plastic or the like and made in its front portion to conform to the general outline of the upper half of the nose member 30. Member 49 is held to member 30 by means of an angle member which may be of a light metal. One leg 50a of the angle member is attached to the upper tail member 49 with rivets 51 (Fig. 14) and its other leg 50b may extend into the space 52 provided around ring 36 in the nose member 30. Clearance openings B and B' (Fig. 5) are provided for the suspension lugs A and A' (Fig. 1) and for the flexible conduit 6 in the upper streamlined semi-cylindrical oval surface of the upper half 49 of the tail portion.

On either side of said openings for the suspension lugs A and A' there are provided protecting fairings 66 and 66' (Fig. 5) which extend well beyond either lug A or A', thereby providing a protective guard for the lugs. These members 66 and 66' may be made of resilient material such as plastic or the like, pressed out to form the shape as shown and provided with flanges which are then fastened with cowl fasteners to the upper half of the tail portion. Member 66' besides having an upper fairing also has a plurality of lower bumps 67 which are made of resilient material such as plastic or the like and are shown in Fig. 8. Said bumps 67 protrude into the interior of the upper half 49 of the hull and help to position the upper portion of the tail section 49. An opening C (Fig. 11) is provided in the upper half of the hull to receive these lower bumps 67 and this opening serves for servicing and inspection purposes. A smaller door 68 (Fig. 5) is attached by hinge 69 on the opposite side of the opening 6 in the upper half 49 of the hull and is closed with a single snap fastener 70. The purpose of this door is to provide an opening D for operating the regulator valve 10 which may be placed just below this door. The streamlined upper half 49 has hinge strips 83 (Fig. 13) riveted to its longitudinal sides, which are reinforced on the inside with strips 84. A plurality of similar inwardly protruding bumps 86 (Fig. 5) are provided on either side of the upper portion 49. The bumps 86 being of a resilient material such as plastic or the like are similar in shape to bumps 67 and are placed in such position that they help to locate the upper portion 49 of the tail section in a manner similar to bumps 67. Angle 94 is attached at the rear end of the upper half 49 and serves as an anchor for a clip 95 which secures a tray 68 into the recess 65 (Figs. 1 and 5) by means of an airplane cowl fastener. The cowl fastener comprises a cowl receptacle 105 attached to clip 95 as shown in Figs. 1 and 9 and a cowl fastener stud 101. The upper half 49 continues its streamlined semi-ovo tubular shape until it drops down near its end forming a recess 65 which is illustrated in Fig. 5. This recess 65 serves as a cradle for a tray 68 which is adapted to carry a packed parachute beneath the parachute cover 106 (Fig. 1). The parachute cover 106 conforms to the general streamlining of the streamlined upper half 49 of the hull tail portion as shown.

The tray 68 (Fig. 17) may be made of reinforced plastic or the like and formed to fit snugly into the recess 65 (Fig. 5). Tray 68 (Fig. 17) has a flat bottom which forms an inclined wall at the front thereof. This wall is long enough to fit into the inclined part of the recess 65 of the streamlined upper portion 49. A low wall 68a is formed at an angle all around the flat bottom and the inclined wall of the tray 68. Along either side on the bottom of this tray 68 (Fig. 16) strips of material, such as canvas, 69 and 69' are attached by a plurality of snap fasteners 70. Fasteners 70 permit the strips 69 and 69' to form a plurality of loops beneath which the shroud lines of the parachute (not shown) are secured in an orderly manner thereby preventing a dangerous fouling of the shroud lines when the parachute is released. Flap 71 is attached to the front wall near the bottom of the tray and provided with two side flaps 72 and 72' which facilitate packing of the parachute. In the center of the top of the flap 71 a standard parachute cone 73 (Fig. 18) is provided. Flap 74 (Fig. 16) is secured at the rear wall near the bottom of the tray 68 and provided with side flaps 75 and 75' and also provided with another parachute cone 73 in the top center thereof. On the right side of tray 68 a flap 76 is secured to the lower right hand wall near the bottom. Flap 76 having eyelets 77 in its upper and lower right hand corners, fits over the parachute cones 73 located in the front and rear flaps 71 and 74 respectively. In line between the eyelets 77 two parachute cones 73 are attached. On the left side of tray 68 another flap 78 is fastened to the low left hand wall 68a near the bottom of said tray. Four reinforced eyelets 77 are provided along the left hand edge section of flap 78 which fit over the four parachute cones 73 when the parachute is packed as shown in Fig. 17. A rip cord 80 having at its end four spaced metallic pins 103 which are inserted into holes 106 of the parachute cones 73 (Fig. 18) and hold the flaps together which comprise the packing of the parachute. In this Fig. 17 it may be observed that the two parachute harness straps 81 are outside of the rear end of the tray assembly and each has a harness snap 82 attached at its end.

The front part of the lower portion 85 (Fig. 6) of the streamlined tail section conforms in shape with the lower half of the nose member 30. Member 85 is fastened to the nose member 30 by means of an angle. One leg 86a of this angle is attached to the hull member 85 with rivets 87, and the other leg 86b extends into the annular space 52 (Fig. 1) as provided around ring 36 in the nose member 30. The angle member may be of a light metal. A plurality of bumps 88 and one bump 88a (Fig. 6) are secured into the lower hull member 85 and serve to locate member 85. The form and quantity of bumps 88 are determined by the outline of the tanks of the jet motor and are made similar to bumps 67. Bump 88a may have a form which is determined by the two aft tanks 2 and 3. The lower streamlined portion 85 is closed at its extreme rear by a reinforced semi-ring 89 through which the nozzle of the jet motor protrudes (Fig. 1).

A V-ring 93 (Fig. 6) is attached on each side of the rear end of the lower hull member 85. The V-rings 93 serve as the connecting members for the parachute harness straps 81 (Fig. 17) whose snaps 82 fasten to the V-rings 93 (Fig. 9).

The lower half 85 has hinge strips 90 (Fig. 13) riveted to its longitudinal sides, which are reinforced on the inside with strips 91. Hinge strips 90 fit into the provided hinge strips 83 of the upper half 49 of the tail portion of the hull. The upper and the lower portion are then held together by a flexible cable 92.

In operation the jet thrust motor unit is attached to the undersurface of the wings of an airplane as shown in Fig. 10. In this embodiment we show one unit placed on each side of the cockpit. Flexible detachable conduits 6 are shown connected with the control panel 107 and leading into the jet motors. Before take-off the regulator valve 10 (Fig. 1) is opened in each jet motor unit. After the pilot has ascertained the pressure and the oxidizer level he presses the button which energizes solenoid valve 7, admitting the pressure from the pressure tank to enter the fuel and oxidizer tanks through the corresponding pressure line valves 8 and 8'. Also the propellant valve is actuated, thereby admitting oxidizer through pipe line 24 into the injector 23 from which it is injected into the combustion chamber of the jet thrust motor, and the fuel is led through pipe 22 direct into the combustion chamber through injector cap 23. The oxidizer and fuel impinge in the combustion chamber and ignite spontaneously. The ensuing gases stream at supersonic velocity out into the air, thereby delivering the additional force required to lift the airplane.

After a short period of time has elapsed, the jet motors having delivered their thrust become useless dead weight for the airplane. The pilot releases one of the jet motors by either pulling on a bomb rack line or pressing another electric button which operates the bomb rack holding means 100. The jet motor unit drops and the rip cord fastened to the underside of the wing section is pulled out of the four cones 73 (Fig. 9) which are holding the packed parachute. A static line 104 having been attached to the top of the parachute and the underside of the airplane wing, pulls the parachute out of its pack. This static line rips and releases the unfolded parachute with its jet motor cargo, which then floats down to earth (Fig. 15). After this performance the pilot releases the second jet thrust motor. It is of importance that only one motor be released at any time in order to prevent fouling of the parachute shrouds. Such jet thrust motor enclosed by a streamlined hull may then be retrieved and its tanks refilled in readiness for additional performance on other airplanes.

The object of my invention has been clearly defined as well as its operation. I do not wish to be limited to the preceding description and attached drawings, but,

I claim:

1. A thrust motor unit comprising liquid propellant tanks rigidly attached together, a thrust motor having an exhaust nozzle and rigidly attached to said tanks, a streamlined hull enclosing said tanks and motor, said hull having a nose portion and a streamlined tail portion, the tail portion being provided with inwardly protruding supports for positioning said tail portion around the tanks and motor, and an opening at the rear of said tail through which said nozzle protrudes.

2. Apparatus according to claim 1 in which said protruding means are radially extending members inside the tail which engage parts of the tanks and thrust motor within the hull.

3. A hollow streamlined hull for containing a jet motor and supply tanks for the motor, comprising a rounded nose, a hollow tail divided into two parts along a horizontal plane intersecting the nose, the two parts being attachable together along said plane and both parts being attachable to the nose, said tail having inwardly protruding members for engaging the tanks and motor within the hull.

4. A hollow streamlined hull for containing a jet motor and supply tanks for the motor, comprising a parabolic-shaped nose containing a shock absorbent filling, said nose having a circular periphery, a hollow tail divided longitudinally into two parts along a plane which is substantially perpendicular to the circle and cuts the circle into two parts, means for fastening the two parts of the tail together along said plane, means for fastening the forward ends of each of said parts to the nose along the circle, said tail parts having inwardly protruding supports for positioning the tanks and motor within the hull.

WILLIAM E. VAN DORN.

REFERENCES CITED

The following references are of record in the file of this patent:

UNITED STATES PATENTS

| Number | Name | Date |
|---|---|---|
| 1,505,520 | Zabriskie | Aug. 19, 1924 |
| 1,540,659 | Smith | June 2, 1925 |
| 2,071,594 | Trimbach | Feb. 23, 1934 |
| 1,836,319 | Gehrung | Dec. 15, 1931 |
| 1,783,227 | Dornier | Dec. 2, 1930 |
| 2,327,359 | Matson et al. | Aug. 24, 1943 |
| 1,793,729 | Askam | Feb. 24, 1931 |

FOREIGN PATENTS

| Number | Country | Date |
|---|---|---|
| 276,911 | Italy | Aug. 22, 1930 |
| 843,985 | France | Apr. 11, 1939 |

OTHER REFERENCES

"Military Rockets," by Alexander Klemin, in Scientific American, issue of Feb. 1942, page 97.